United States Patent
Koumo et al.

(10) Patent No.: US 7,238,015 B2
(45) Date of Patent: Jul. 3, 2007

(54) CONTROL SYSTEM FOR CONTINUOUS RUBBER MOLDING APPARATUS

(75) Inventors: Makoto Koumo, Osaka (JP); Masayoshi Abe, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/786,820

(22) Filed: Feb. 25, 2004

(65) Prior Publication Data
US 2005/0186301 A1 Aug. 25, 2005

(51) Int. Cl.
*B29C 47/92* (2006.01)
(52) U.S. Cl. .................. 425/149; 425/144; 425/205
(58) Field of Classification Search ............... 425/143, 425/144, 149, 205
See application file for complete search history.

(56) References Cited

U.S. PATENT DOCUMENTS

| | | | | |
|---|---|---|---|---|
| 4,721,589 A | * | 1/1988 | Harris | 264/40.1 |
| 4,863,653 A | * | 9/1989 | Takubo et al. | 264/40.7 |
| 4,938,908 A | * | 7/1990 | Shiraki et al. | 264/209.2 |
| 5,061,170 A | * | 10/1991 | Allen et al. | 425/197 |
| 5,378,415 A | * | 1/1995 | Gohlisch et al. | 264/40.1 |
| 6,007,760 A | * | 12/1999 | Shiraki et al. | 264/503 |
| 2002/0089077 A1 | * | 7/2002 | Ogawa etal. | 264/40.6 |

FOREIGN PATENT DOCUMENTS

| | | |
|---|---|---|
| JP | 2000-141457 | 5/2000 |
| JP | 2001-30338 | 2/2001 |

* cited by examiner

*Primary Examiner*—Joseph S. Del Sole
(74) *Attorney, Agent, or Firm*—Jordan & Hamburg LLP

(57) ABSTRACT

A control system for continuous rubber molding apparatus comprising; a feed portion for feeding a rubber material previously removed of foreign substances or particles in the previous step; an extruder for kneading the fed rubber material and feeding forward the kneaded material; and a gear pump for delivering the rubber material, fed from the extruder, to a forming nozzle, the forming nozzle continuously extruding a rubber ribbon used for building a tire. The control system comprises: a pressure sensor for sensing a pressure in the gear pump; pressure comparator for comparing a sensed pressure and a set value; and motor controller for controlling the number of revolutions of a motor based on a comparison result given by the pressure comparator, the motor operative to drive a screw of the extruder.

3 Claims, 3 Drawing Sheets

CONTROL SYSTEM FOR CONTINUOUS RUBBER MOLDING APPARATUS

BACKGROUND OF THE INVENTION

1. Field of the Invention

The present invention relates to a control system for controlling a continuous rubber molding apparatus including: a feed portion for feeding a rubber material already removed of foreign substances or particles in the previous step: an extruder for kneading and feeding forward the rubber material fed thereto; and a gear pump for delivering the rubber material, fed from the extruder, to a forming nozzle.

2. Background Art

The continuous rubber molding apparatus generally takes the following procedure for rubber molding. The procedure includes the steps of: feeding a rubber material via a feed port; kneading and extruding the fed rubber material by means of a screw of the extruder; removing foreign substances or particles from the extruded rubber material by passing the material through a strainer; delivering a constant amount of rubber material, which is removed of the foreign substances or particles, to a forming nozzle by means of a gear pump; and continuously extruding a rubber ribbon of a predetermined sectional shape from the forming nozzle. The rubber ribbon is sequentially wound on an outer periphery face of a tire-building drum, thereby forming a rubber layer of a tire. Such a continuous rubber molding apparatus is known to the art, such as one disclosed in JP-2001-30338A, for example.

For size reduction of the continuous rubber molding apparatus, there may be contemplated an arrangement wherein the screw of the extruder is shortened. An advantage of downsizing the continuous rubber molding apparatus is that the rubber ribbon extruded from the continuous rubber molding apparatus can be directly supplied to a tire-building drum. In order to wind the rubber ribbon on the tire-building drum, the rubber ribbon must be moved along an axial direction of a shaft of the tire-building drum. If, in this case, the continuous rubber molding apparatus can be downsized, the continuous rubber molding apparatus itself may be moved in a manner that the rubber ribbon may be directly and sequentially wound on an outer periphery face of the tire-building drum. Hence, the screw may be shortened to downsize the continuous rubber molding apparatus, as described above, thereby accomplishing the size reduction of the continuous rubber molding apparatus.

However, the following problem is encountered where the screw is shortened. The shortened screw entails varied outputs of the rubber ribbon extruded from a forming nozzle so that the rubber ribbon cannot be formed in a desired shape. This is because the rubber material to be kneaded is varied in viscosity so as to cause variations of pressure in the gear pump.

In view of the foregoing, it is intended to provide a control system for continuous rubber molding apparatus; the system ensuring a consistent output of a rubber ribbon from the apparatus even if the apparatus is downsized by shortening a screw.

SUMMARY OF THE INVENTION

According to the invention for solving the above problem, a control system for continuous rubber molding apparatus comprising: a feed portion for feeding a rubber material already removed of foreign substances or particles in the previous step; an extruder for kneading the fed rubber material and feeding forward the kneaded material; and a gear pump for delivering the rubber material, fed from the extruder, to a forming nozzle, the forming nozzle continuously extruding a rubber ribbon to be used for building a tire. And, the control system comprises: a pressure sensor for sensing a pressure in the gear pump; pressure comparator for comparing a sensed pressure and a set value; and motor controller for controlling the number of revolutions of a motor based on a comparison result given by the pressure comparator, the motor operative to drive a screw of the extruder.

According to the arrangement, the feed port of the continuous rubber molding apparatus is first supplied with the rubber material already removed of the foreign substances or particles in the previous step. This negates the need to provide a strainer in the continuous rubber molding apparatus, the strainer serving to remove the foreign substances or particles. Hence, the continuous rubber molding apparatus may be reduced in size accordingly.

The system is provided with the pressure sensor for sensing the pressure in the gear pump. The system compares the sensed pressure with the set value and then, controls the number of revolutions of the screw of the extruder in a manner to provide a previously set pressure value. Thus is prevented the variations of the pressure in the gear pump. Therefore, the output of the rubber ribbon extruded from the forming nozzle may be stabilized, as well. In consequence, there is provided the control system for continuous rubber molding apparatus which ensures a consistent output of the rubber ribbon from the apparatus even if the apparatus is downsized by shortening the screw.

According to another preferred embodiment of the invention, the system may further comprise; a temperature sensor for sensing a temperature in the gear pump; temperature comparator for comparing a sensed temperature with a set value; and temperature controller for controlling the temperature in the gear pump based on a comparison result given by the temperature comparator.

Unless the temperature in the gear pump of the continuous rubber molding apparatus is stabilized, the rubber ribbon extruded from the forming nozzle becomes instable in solid-state or molten-state properties thereof. If the gear pump is intermittently operated over and over again, the temperature in the gear pump is varied. Such temperature variations may also cause the variations of the rubber output from the forming nozzle.

Hence, the temperature sensor is provided for sensing the temperature in the gear pump, as described above, so that the temperature may be controlled to the previously set value. Thus is stabilized the temperature in the gear pump. As a result, the formed rubber ribbon has stable physical properties whereas the output of the rubber ribbon is also stabilized.

According to still another preferred embodiment of the invention, a ratio (L/D) between the length "L" and the outside diameter "D" of the screw of the extruder is in the range of 1 to 8 (inclusive).

By providing the pressure control or temperature control according to the invention, it is ensured that the rubber ribbon is outputted in a stable manner even though the ratio L/D of the screw is limited to such a numerical range. If the ratio (L/D) is less than 1, the rubber material is not fully plasticized. If the ratio (L/D) exceeds 8, a mechanism for moving the continuous rubber molding apparatus is also increased in size, which is uneconomical.

DETAILED DESCRIPTION OF THE INVENTION

Figure 1:
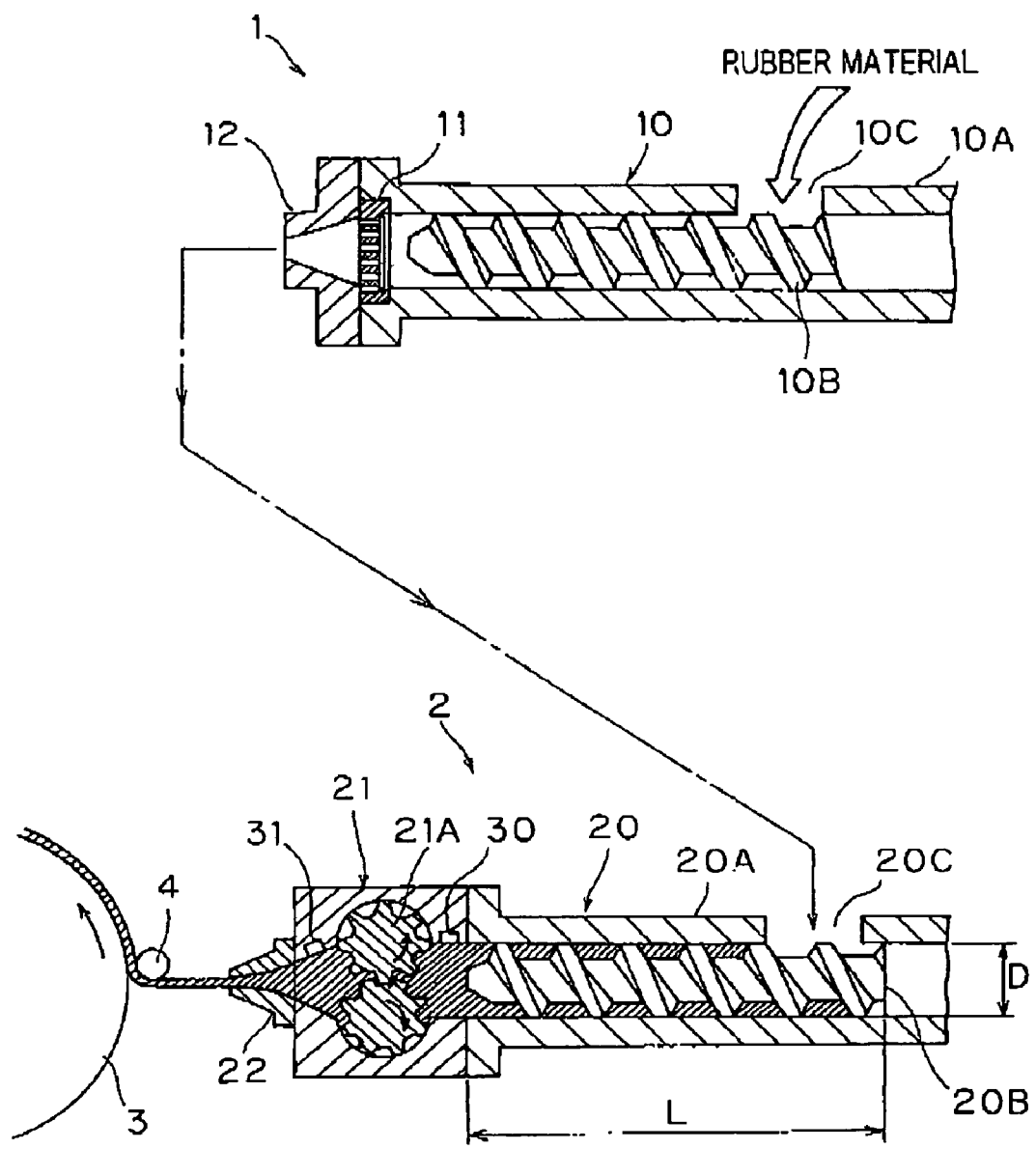
FIG. 1 are diagrams showing arrangements of a first extruding machine and a second extruding machine.

A control system for continuous rubber molding apparatus according to a preferred embodiment of the invention will be described with reference to the accompanying drawings.

<Arrangement of Continuous Rubber Molding Apparatus>

The system includes at least a first continuous rubber-extruding machine 1 (hereinafter, referred to as "first extruding machine"), and a second continuous rubber-extruding machine 2 (hereinafter, referred to as "second extruding machine"). As schematically shown in an upper portion of FIG. 1, the first extruding machine 1 includes a first extruder 10, a strainer 11 and a first forming nozzle 12. The first extruder 10 includes a barrel 10A having a cylindrical section, a screw 10B, and a feed port 10C through which a rubber material is fed into the extruder. Fed through the feed port 10C is a rubber material formed into a sheet form by the previous step of blending the rubber material. The screw 10B is rotated thereby kneading the rubber material and feeding the rubber material forwardly.

Figure 3A:
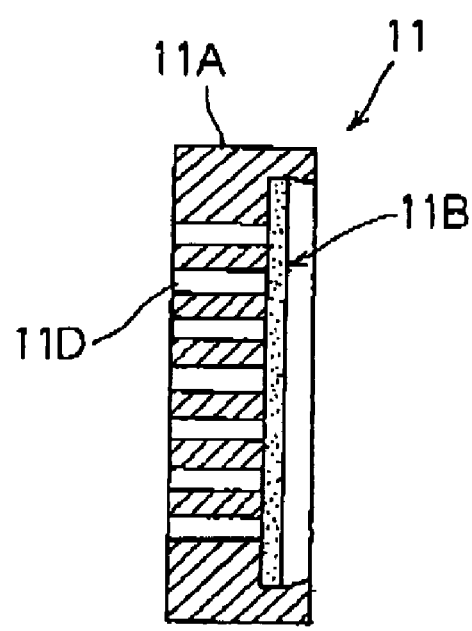
FIG. 3 are diagrams showing a structure of a strainer.
Figure 3B:
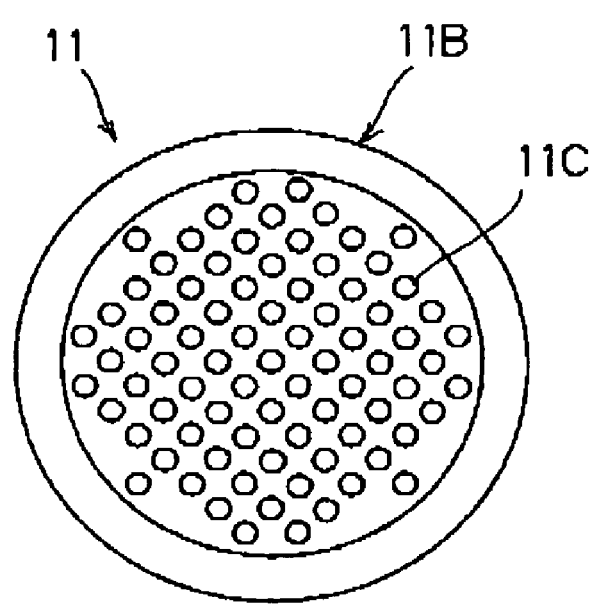

The strainer 11 is shown in FIG. 3. FIG. 3A is a sectional view of the strainer whereas FIG. 3B is a front view thereof. The strainer 11 includes a support body 11A and a metal mesh 11B fitted in the support body. The metal mesh 11B is formed with a plurality of fine pores 11C. The support body 11A is formed with a plurality of ribs 11D. The rubber material is fed from the right side on the drawing of FIG. 3A and passed through the strainer to the left side. The rubber material may be removed of foreign substances or particles by passing the material through the strainer 11.

A pre-processed rubber ribbon or a "first rubber ribbon" outputted from the first forming nozzle 12 has a sectional shape of a circle, square or rectangle. However, the sectional shape of the rubber ribbon is not particularly limited. The pre-processed rubber ribbon is fed to the second extruding machine 2 to be described hereinafter and hence, may have any shape suited for the feeding purpose.

As schematically shown in a bottom portion of FIG. 1, the second extruding machine 2 includes a second extruder 20 of a smaller size, a gear pump 21 and a second forming nozzle 22. The second extruder 20 includes a barrel 20A having a cylindrical cross section, a screw 20B, and a feed port 20C. Fed through the feed port 20C is the rubber ribbon extruded from the first extruding machine 1 in the previous step. The screw 20B is rotated thereby kneading the rubber material and feeding forward the rubber material.

The rubber material is moved forward by the screw 20B so as to be supplied to the gear pump 21. Incidentally, it is unnecessary to provide a strainer because the foreign substances or particles are already removed in the previous step. The gear pump 21 includes a pair of gears 21A driven as rotated for delivering a constant amount of rubber material to the second forming nozzle 22. The second forming nozzle 22 outputs a rubber ribbon or a "second rubber ribbon" having a predetermined cross sectional shape. The cross section of the rubber ribbon may be shaped like a triangle, crescent or the like.

The rubber ribbon extruded from the second forming nozzle 22 is directly supplied to a tire-building drum 3 via a pressure roller 4. To wind the rubber ribbon on the tire-building drum 3, the second extruding machine 2 may be moved axially of the tire-building drum 3 that is maintained as driven as rotated.

A pressure sensor 30 and a temperature sensor 31 are provided in the gear pump 21. The pressure sensor 30 is disposed at place near a distal end of the screw 20D or in proximity of an inlet between the gears 21A. The pressure sensor 30 is fixed in a wall surface of a casing and is operative to sense the pressure in the gear pump. On the other hand, the temperature sensor 31 is also disposed in the gear pump 21 at place just before the second forming nozzle 22. The temperature in the gear pump 21 is sensed by the temperature sensor 31.

<Features of System Arrangement>

The system according to the embodiment employs the two types of extruding machines for extruding the rubber ribbons; the extruding machines including the first extruding machine 1 and the second extruding machine 2. Description is made on these extruding machines. The first extruding machine 1 is constructed as a large machine which kneads the rubber material as removing the foreign substances or particles therefrom by means of the strainer 11. The second extruding machine 2 is constructed as a smaller machine which supplies the rubber ribbon directly to the tier-building drum 3. In order to wind the rubber ribbon on the tire-building drum 3, the rubber ribbon need to be moved along an axial direction of a shaft of the building drum 3, which is a direction perpendicular to the drawing surface of the bottom portion of FIG. 1. The second extruding machine 2 is downsized so that the second extruding machine 2 itself may be moved relative to the tire-building drum 3; thereby permitting the rubber ribbon to be wound in a manner to form a desired rubber layer.

In the pre-processing, as described above, the first extruding machine 1 kneads the rubber material and also removes the foreign substances or particles therefrom and hence, the second extruding machine 2 may be reduced in size. Specifically, the second extruding machine 2 may be downsized by shortening the screw 20B. In addition, the second extruding machine does not require the strainer 11 and hence, the second extruding machine may be further downsized accordingly. The length of the screw 20B may be defined as:

$1 \leq L/D \leq 8$, where L denotes a length of the screw whereas D denotes an outside diameter of the screw, as shown in a bottom portion of FIG. 1. More preferably, the length of the screw may be defined as $3.5 \leq L/D \leq 5.5$. In the general extruding machines, the length of the screw is in the range of $12 \leq L/D \leq 16$. Thus, the inventive system can accomplish substantial downsizing of the system.

Unfortunately, the downsizing of the second extruding machine 2 leads to another problem. Specifically, where the screw 20B is shortened, the pressure and temperature in the gear pump 21 is more susceptible to variations. Such variations of the pressure or the temperature constitute a causative factor of varied outputs of the rubber ribbon outputted from the second forming nozzle 22. The varied outputs lead to the forming of a rubber ribbon suffering inconsistent shapes. As a result, it becomes impossible to build a tire of a desired quality. On this account, the invention constructs the system for controlling the temperature and pressure in the gear pump.

<Arrangement of Control System>

Figure 2:
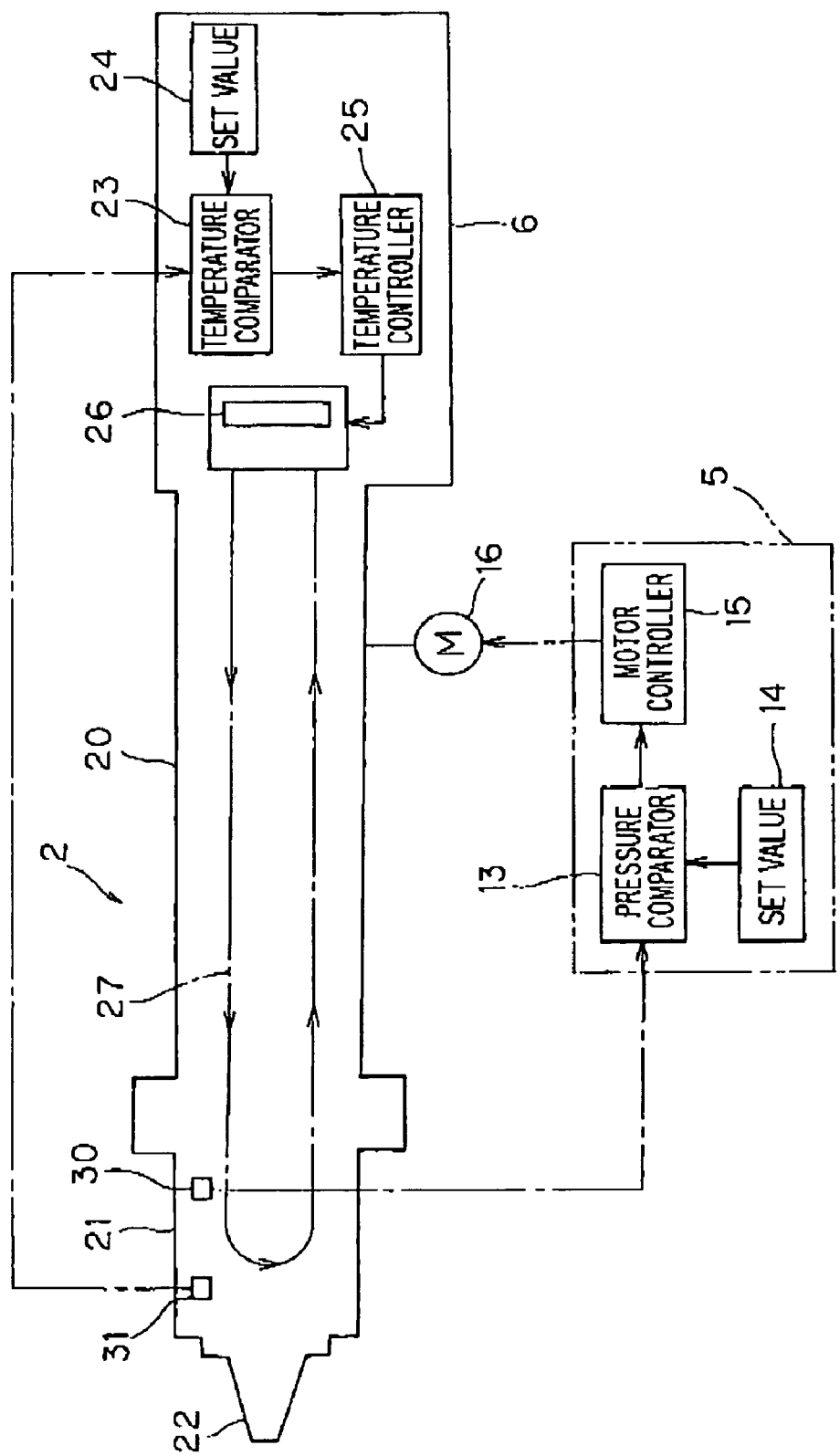
FIG. 2 is a schematic diagram explanatory of a system for controlling pressure and temperature in a gear pump.

Next, the system for controlling the pressure and temperature in the gear pump is described with reference to a schematic diagram of FIG. 2. The control system includes a pressure controller 5 for controlling the pressure, and a temperature controller 6 for controlling the temperature.

A pressure comparator 13 receives a pressure value determined by the pressure sensor 30 and compares the pressure value with a set value 14. The set value 14 is previously defined and stored in a memory. The set value may be inputted by an operator using input means such as a key board.

Where an input pressure value differs from the set value, the pressure comparator 13 sends a command to a motor controller 15 such as to bring the sensed value into coincidence with the set value. The motor controller 15 controls the number of revolutions of a drive motor 16 for driving the screw 20B. The pressure in the gear pump 12 can be varied by changing the number of revolutions of the screw 20B. The number of revolutions of the screw 20B may be controlled as described above whereby the pressure in the gear pump 12 is controlled to be maintained at a constant level.

Temperature comparator 23 receives a temperature value determined by the temperature sensor 31 and compares the sensed value with a set value 24. The set value 24 is previously defined and stored in the memory. The set value 24 may be inputted by the operator using the input means such as the key board.

Where an input temperature value differs from the set value, the temperature comparator 23 sends a command to a temperature controller 25 such as to bring the sensed value into coincidence with the set value. The temperature controller 25 controls the temperature of a heater 26. Piping 27 for water circulation is laid within the gear pump 21 and the second extruder 20. The temperature of the circulation water can be controlled by the heater 26. By controlling the temperature of the water through the piping, as described above, the temperature in the gear pump 21 may be controlled to be maintained at a constant level. Where a control is to be made to lower the temperature, cool water may be circulated through the piping.

The controllers 5, 6 may be implemented using the function of a computer. Control programs are used for controlling the drive motor 16 and the heater 26. That is to construct the controllers, the hardware and software may be properly combined in accordance with specific condition or usage. Signals from the pressure sensor 30 and the temperature sensor 31 are analog-to-digital-wise (A/D) converted before compared with the set values 14, 24.

Even if the second extruding machine 2 is downsized, the output of the rubber ribbon extruded from the second forming nozzle 22 may be stabilized by controlling the pressure in the aforementioned manner. The size reduction of the second extruding machine 2 provides for the size reduction of the overall facility. Furthermore, the gear pump 21 is increased in measurement accuracies. Whether the apparatus is continuously operated or is intermittently operated over and over again, the apparatus provides a consistent output. Since the pressure in the gear pump 21 is maintained at a constant level, the apparatus suffers less pressure loss during high-speed operation. Furthermore, the apparatus provides a consistent output regardless of composition variations of the rubber material.

The rubber material in the gear pump 21 is stabilized in viscosity by controlling the temperature in the aforementioned manner. This results in a reduced load on the gears 21A or the second forming nozzle 22. Even when the apparatus is intermittently operated over and over again, the apparatus provides a consistent output because the temperature of the rubber material is less varied. Furthermore, the outputted rubber ribbon is less varied in temperature and hence, the rubber is stabilized in the physical properties.

<Modifications>

The embodiment has been described based on the premise that the second extruding machine 2 is downsized. However, the invention is also applicable to a large machine including a screw of a substantial length. The rubber ribbon formed by extrusion is not limited to a particular shape. A portion of the tire to be formed by use of the rubber ribbon is not limited to a particular part or region.

What is claimed is:

1. A control system for controlling a continuous rubber molding apparatus continuously extruding a rubber ribbon to be used for building a tire, the control system comprising:

a first continuous rubber-extruding machine and a second continuous rubber-extruding machine, said first continuous rubber-extruding machine having a first extruder, a strainer placed at a forward position, and a first forming nozzle placed at a further forward position, said first extruder having a barrel, a screw placed therein and a feed port, said second continuous rubber-extruding machine having a second extruder, a gear pump placed at a forward position and a second forming nozzle placed at a further forward position, said second extruder having a barrel, a screw placed therein and a feed port, wherein a rubber material formed into a sheet form by a previous step of blending the rubber material is now fed through the feed port of said first extruder and is fed forwardly while being kneaded by rotation of said screw, and passes said strainer whereby foreign substances or particles are removed, and is outputted from said first forming nozzle in a form of a first rubber ribbon having a cross-section corresponding to the shape of said first forming nozzle, said first rubber ribbon is fed through said feed port of said second continuous rubber-extruding machine, and is fed forwardly while being kneaded by rotation of said screw, and passes said gear pump, and is outputted continuously by said gear pump driven as rotated through said second forming nozzle in a form of a second rubber ribbon with a cross-sectional shape corresponding to the shape of said second forming nozzle, said second rubber ribbon being used for building a tire, said control system further having:

a pressure sensor for sensing a pressure in the gear pump;

pressure comparator for comparing a sensed pressure and a set value; and motor controller for controlling the number of revolutions of a motor based on a comparison result given by the pressure comparator, the motor being operative to drive a screw of said second extruder.

2. A control system for continuous rubber molding apparatus as claimed in claim 1 further comprising:

a temperature sensor for sensing a temperature in the gear pump; temperature comparator for comparing a sensed temperature with a set value; and temperature controller for controlling the temperature in said gear pump based on a comparison result given by the temperature camparator.

3. A control system for continuous rubber molding apparatus as claimed in claim 1 or 2, wherein a ratio (L/D) between the length L and the outside diameter D of the screw of said extruder and is in the range of 1 to 8, as inclusive.

* * * * *